(12) United States Patent
Parolini et al.

(10) Patent No.: US 11,117,839 B2
(45) Date of Patent: Sep. 14, 2021

(54) DENSIFICATION OF MELT INFILTRATED CERAMIC MATRIX COMPOSITE (CMC) ARTICLES

(71) Applicant: General Electric Company, Schenectady, NY (US)

(72) Inventors: Jason Robert Parolini, Anderson, SC (US); Canan Uslu Hardwicke, Greenville, SC (US); Srikanth Chandrudu Kottilingam, Greenville, SC (US); James Joseph Murray, III, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 106 days.

(21) Appl. No.: 16/393,360

(22) Filed: Apr. 24, 2019

(65) Prior Publication Data

US 2020/0339483 A1 Oct. 29, 2020

(51) Int. Cl.
*C04B 41/45* (2006.01)

(52) U.S. Cl.
CPC ................ *C04B 41/4584* (2013.01)

(58) Field of Classification Search
CPC .................................. C04B 41/4584
See application file for complete search history.

(56) References Cited

U.S. PATENT DOCUMENTS

| 5,322,109 | A | * | 6/1994 | Cornie | B22D 19/14 |
| | | | | | 164/103 |
| 6,737,168 | B1 | | 5/2004 | Yamagata et al. | |
| 6,767,602 | B1 | | 7/2004 | Duval et al. | |
| 9,234,430 | B2 | | 1/2016 | Cairo et al. | |
| 2005/0184413 | A1 | * | 8/2005 | Forest | B29C 70/48 |
| | | | | | 264/29.1 |
| 2006/0141257 | A1 | | 6/2006 | Subramanian et al. | |
| 2012/0156466 | A1 | | 6/2012 | Bell et al. | |
| 2014/0007515 | A1 | | 1/2014 | Sigalas et al. | |

(Continued)

FOREIGN PATENT DOCUMENTS

EP 1676824 A1 7/2006

OTHER PUBLICATIONS

Extended Search Report issued in connection with corresponding European Application No. 20177618.4 dated Oct. 5, 2020, 9 pages.

(Continued)

*Primary Examiner* — Tabatha L Penny
(74) *Attorney, Agent, or Firm* — James Pemrick; Hoffman Warnick LLC

(57) ABSTRACT

Various embodiments include methods for densifying a melt infiltrated ceramic matrix composite (CMC) article, and a densified melt infiltrated CMC article formed thereby. Particular embodiments include a method including: providing a porous CMC preform within a first region of a casting apparatus; providing a molten densifier within a pressure head area of a second region of the casting apparatus, the first and second regions being operably connected and the molten densifier including at least one source of silicon; and applying a first pressure to the molten densifier within the pressure head, thereby infiltrating voids within the porous CMC preform with the molten densifier and forming a densified melt infiltrated CMC article.

11 Claims, 5 Drawing Sheets

(56) References Cited

U.S. PATENT DOCUMENTS

2018/0244583 A1    8/2018  Soiling et al.

OTHER PUBLICATIONS

PCT Search Report and Opinion issued in connection with corresponding PCT Application No. PCT/US2020/028284 dated Sep. 14, 2020, 19 pages.
Information Concerning Elected Offices issued in connection with corresponding PCT Application No. PCT/US2020/028284 dated Dec. 10, 2020, 1 page.
Notification of Transmittal of International Preliminary Report on Patentability issued in connection with corresponding PCT Application No. PCT/US2020/028284 dated Jan. 22, 2021, 51 pages.
EP Patent Application No. 20177618.4, Reply to Written Opinion and Amended claims and description dated Jun. 8, 2021, 506154-EP-2, 20 pgs.
PCT Patent Application No. PCT/US2020/028284 Search Strategy dated Jun. 20, 2021, 326666-WO-2, 2 pgs.

* cited by examiner

DENSIFICATION OF MELT INFILTRATED CERAMIC MATRIX COMPOSITE (CMC) ARTICLES

TECHNICAL FIELD

The present disclosure generally relates to densification of ceramic matrix composite (CMC) articles, and more particularly to densification of melt infiltrated CMC components of a gas turbine engine.

BACKGROUND

Ceramic matrix composite (CMC) articles are generally considered well suited for structural components of a turbine engine due to, for example, their thermal resistance, high temperature strength, and chemical stability. However, CMC articles in a turbine engine can suffer from damage due to overstressing, damage (e.g., fracture), improper formation, etc. One technique for addressing the damage-prone nature of the CMC articles is densification. However, the success of conventional techniques for densifying a melt infiltrated CMC is limited due to the myriad of defects that can occur as a result of infiltration of a densifier (e.g., infiltration of silicon). Such defects in silicon infiltration can cause, for example, obstructions, cracks, and/or areas of reduced material infiltration during the densification process and therefore weaknesses within the resulting densified CMC article. These drawbacks with conventional densified CMC articles tend to be exacerbated the thicker the CMC article.

Conventional techniques for casting parts (e.g., metal casting) include injection molding, high pressure die casting, and low pressure die casting. Injection molding may inject the material to form the part at a velocity between 30 to 200 millimeters per second (mm/s), and under an injection pressure of 300 to 800 Bars. High pressure die casting may inject the metal material (e.g., aluminum (Al) alloy) to form the part at a velocity above 200 mm/s, and under an injection pressure of 1000 Bars or more. Low pressure die casting is performed using lower operational parameters for example, injection velocity 10 mm/s, injection pressure 5-10 Bars. However, none of these conventional techniques for casting have been utilized to perform the densification process on CMC articles because the operational parameters for performing the techniques may increase the likelihood and/or may cause damage to the CMC articles when performing the densification process.

BRIEF SUMMARY

Methods for densifying a melt infiltrated ceramic matrix composite (CMC) article and densified CMC articles formed thereby are disclosed. In a first aspect of the disclosure, a method for densifying a melt infiltrated CMC article includes: providing a porous CMC preform within a first region of a casting apparatus; providing a molten densifier within a pressure head area of a second region of the casting apparatus, the first and second regions being operably connected and the molten densifier including at least one source of silicon; and applying a first pressure to the molten densifier within the pressure head, thereby infiltrating voids within the interconnected porous CMC preform with the molten densifier and forming a densified melt infiltrated CMC article.

In a second aspect of the disclosure, a method for densifying a melt infiltrated CMC article includes: providing a porous CMC preform within a first region of a casting apparatus; providing a molten densifier within a pressure head area of a second region of the casting apparatus, the first and second regions being operably connected and the molten densifier including at least one source of silicon; applying a stage-one pressure to the molten densifier within the pressure head for a first period of time, the stage-one pressure being sufficient to establish a first infiltration velocity of the molten densifier across a first depth of the porous CMC preform; and applying a stage-two pressure to the molten densifier within the pressure head for a second period of time, the stage-two pressure being different than the stage-one pressure and being sufficient to establish a second infiltration velocity of the molten densifier across a second depth of the porous CMC preform, the second depth not including the first depth.

In a third aspect of the disclosure, a densified melt infiltrated CMC article includes: a porous ceramic matrix having at least silicon infiltrated therein, and ceramic fibers embedded in the ceramic matrix, wherein the densified melt infiltrated CMC article has a substantially uniform density.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
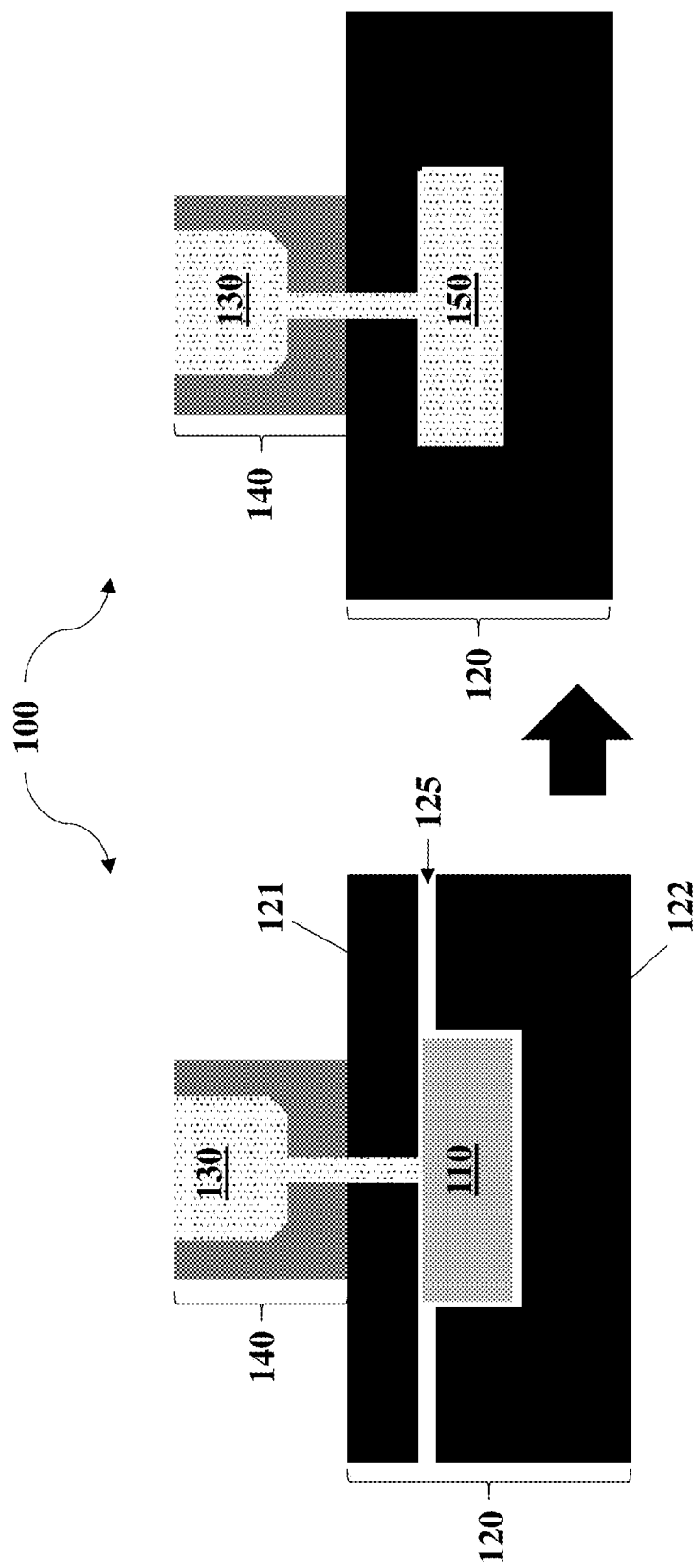
FIG. 1 depicts a schematic of an exemplary casting apparatus for forming a densified melt infiltrated ceramic matrix composite (CMC) article of the disclosure, including both pre-infiltration and post-infiltration arrangements.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

The present disclosure generally relates to densification of ceramic matrix composite (CMC) articles, and more particularly to densification of melt infiltrated CMC components of a gas turbine engine. As noted above, the success of conventional techniques for densifying a melt infiltrated CMC is limited due to the myriad of defects that can occur as a result of infiltration of a densifier (e.g., infiltration of silicon) and which in turn results in obstructions (lacks of infiltration) and/or cracks during the densification process. Accordingly, such conventional techniques provide densified CMC articles with a non-uniform density (e.g., dry spots, porosity) and locations of weakness therein, both of which can be worsened as the thickness of the CMC article increases (e.g., extreme non-uniformity of density and/or increased locations of weakness). In contrast to convention, various aspects of the disclosure include methods for densifying a melt infiltrated CMC article by creating a pressure head of a molten silicon source during infiltration and using a casting apparatus to effect infiltration. Densified melt infiltrated CMC articles produced according to the methods of the disclosure can have a substantially uniform density, even as the thickness of the CMC article is increased. The methods of the disclosure for densifying a melt infiltrated CMC article will be discussed below with reference to FIGS. 1-5 for ease of comprehension.

In an embodiment, the method of the disclosure for densifying a melt infiltrated CMC article includes first providing a porous CMC preform. "CMC" as used herein refers to ceramic matrix composite wherein ceramic fibers are embedded in a ceramic matrix. A CMC article may include a ceramic matrix continuously or discontinuously reinforced with ceramic fibers. The ceramic matrix may include carbon (C), silicon carbide (SiC), silicon nitride ($Si_3N_4$), aluminum oxide ($Al_2O_3$) and/or aluminum silicate ($Al_2O_3$—$SiO_2$). The ceramic fibers may include carbon (C), silicon carbide (SiC), silicon nitride ($Si_3N_4$), aluminum oxide ($Al_2O_3$) and/or aluminum silicate ($Al_2O_3$—$SiO_2$). The ceramic matrix and the ceramic fibers may be composed of the same material or they may be different. For instance, when the ceramic matrix and the ceramic fibers are composed of the same material, the CMC article may be, for example, a silicon carbide fiber reinforced silicon carbide (SiC/SiC) article. When the ceramic matrix and the ceramic fibers are composed of different materials, the CMC article may be, for example, a carbon fiber reinforced silicon carbide (C/SiC) article. Typically, CMC articles may be made from any suitable manufacturing process known in the art such as, for example, injection molding, slip casting, tape casting, infiltration methods (e.g., chemical vapor infiltration, melt infiltration, etc.) and various other suitable methods and/or processes. The present disclosure relates to densifying melt infiltrated CMC articles. As such, a "CMC preform" as used herein refers to a CMC article prior to melt infiltration with a densifier.

Referring to FIG. 1, a CMC preform 110 is provided within a first region 120 of a casting apparatus 100. CMC preform 110 is a pre-infiltration CMC article as explained above. FIG. 1 includes both a depiction of a pre-infiltration arrangement (left side of arrow) and a post-infiltration arrangement (right side of arrow) of casting apparatus 100.

The method of the disclosure further includes providing a molten densifier 130 within a pressure head area of a second region 140 of casting apparatus 100. Providing molten densifier 130 in second region 140 may occur before, after or contemporaneously with providing porous CMC preform 110 in first region 120. First and second regions 120, 140 of apparatus 100 are operably connected to one another such that molten densifier 130 may be applied to CMC preform 110. Molten densifier 130 may include any suitable molten source of a compound or composition capable of increasing the density of porous CMC preform 110. Molten densifier 130 may include, for example, one or more molten sources of silicon.

After providing both CMC preform 110 and molten densifier 130, the method of the disclosure can further include applying a first pressure to molten densifier 130. The first pressure can include atmospheric pressure (e.g., 1 Bar) or a pressure slightly greater than atmospheric pressure (e.g., less than 3 Bars). In another non-limiting example, applying the first pressure to molten densifier 130 may be performed in or under a vacuum at a pressure lower than atmospheric pressure, for example, approximately $1.33 \times 10^{-6}$ Bars. In other non-limiting examples, the first pressure may be applied during the densification process to CMC preform 110 within a range of approximately 1 Millibar to 1 Bar. The first pressure allows for infiltration of voids (pores) within porous CMC preform 110 by molten densifier 130. As depicted in FIG. 1 (right side of arrow), a densified melt infiltrated CMC article 150 is formed by this infiltration.

FIG. 1 also depicts an embodiment where the first pressure can be atmospheric pressure. As shown, first and second regions 120, 140 of apparatus 100 are oriented with one another such that the weight of molten densifier 130 itself can cause infiltration of CMC preform 110 with the molten densifier 130. This type of atmospheric pressure based arrangement may also be referred to as a gravity fed system.

Even in a gravity fed system where increased pressures are not of concern, the material characteristics of CMC preform 110 may need to be accounted for by apparatus 100. In an embodiment, first region 120 of apparatus 100 may be a die set having at least two portions 121, 122. Portions 121, 122 can be capable of moving relative to one another such that a die opening 125 can be created there between. Thus, prior to infiltration (left side of arrow FIG. 1), die opening 125 may be set (adjusted) to reduce or eliminate pressure on CMC preform 110 in order to avoid damaging (e.g., fracturing) the CMC preform's 110 porous matrix. The width of die opening 125 can be adjusted, for example decreased, during infiltration as the density of CMC preform 110 increases. Upon infiltration completion (right side of arrow FIG. 1), the width of die opening 125 may be approximately zero. Additionally, or alternatively, the performance of this process and/or the closing of the width of die opening 125 to approximately zero may improve the debulking of the CMC preform and/or part-to-part dimensional/size/feature consistencies.

In the example where apparatus 100 is formed as a gravity fed system (e.g., FIG. 1) molten densifier 130 may be delivered at a controlled speed. For example, molten densifier 130 may be delivered at a controlled velocity of less than or equal to 1 millimeter per second (mm/s). In delivering molten densifier 130 at this speed (as well as under the pressure identified herein), molten densifier 130 may infiltrate CMC preform 110 without causing undesirable stress/strain, damage (e.g., fracture), and/or improper formation during the densification process.

In addition to a gravity fed system, apparatus 100 of FIG. 1 can be used in a pressure based system as well. In other words, the first pressure applied to molten densifier 130 may be greater than atmospheric pressure. In such a pressure based system, controlling and adjusting the width of die opening 125 may be critical for avoiding damage to the CMC preform 110.

Figure 2:
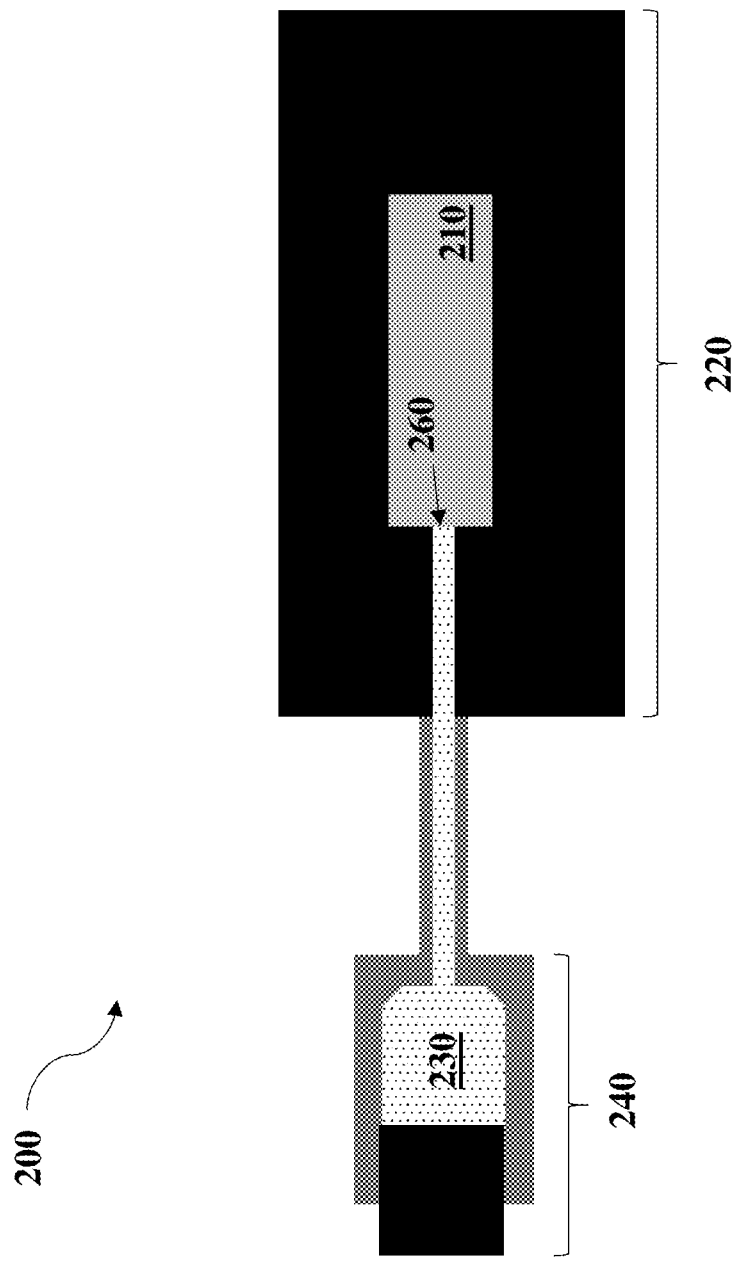
FIG. 2 depicts a schematic of another exemplary casting apparatus for forming a densified melt infiltrated CMC article of the disclosure.

FIG. 2 depicts another embodiment where the first pressure may be greater than atmospheric pressure. In this embodiment, a porous CMC preform 210 is provided within a first region 220 of a casting apparatus 200. Before, after or contemporaneously with providing porous CMC preform 210 in first region 220, a molten densifier 230 can be provided within a pressure head area of a second region 240 of casting apparatus 200. Preform 210 and molten densifier 230 may be the same as described above (110, 130).

Taking into consideration the increased pressure of this embodiment (i.e., greater than atmospheric), first and second regions 220, 240 of casting apparatus 200 may be operably coupled with one another such that the infiltrating of preform 210 with molten densifier 230 at the increased pressure is performed without damaging the porous matrix of preform 210. For example, one or both of first and second regions 220, 240 of apparatus 200 may include an inlet 260 for passing molten densifier 230 to preform 210. Inlet 260 can be configured to reduce a velocity of molten densifier 230 upon contact with preform 210. One inlet 260 is depicted, however any number and any configuration of inlet(s) 260 may be utilized. In this non-limiting example, and similar to FIG. 1, molten densifier 230 may be delivered at a controlled velocity of less than or equal to 1 mm/s by controlling and/or adjusting the pressure in which molten densifier 230 is delivered in apparatus 200.

The methods of the disclosure can be performed with reliance on a first pressure applied to the system (e.g., atmospheric for a gravity fed system and greater than atmospheric for a pressure based system), as discussed above. The methods of the disclosure may also be performed utilizing multiple pressures.

Returning to FIG. 1, first region 120 of casting apparatus 100 that holds preform 110 therein may have a second pressure associated therewith. For example, the second pressure may be less than the first pressure applied to molten densifier 130. For instance, the second pressure may be less than atmospheric pressure. In an instance where first pressure is atmospheric pressure, as is the case in a gravity fed system, the second pressure being less than atmospheric pressure may aid in the infiltration process by pulling (or wicking) molten densifier 130 into preform 110. This pulling of molten densifier 130 into preform 110 can be in addition to the weight of molten densifier 130 pushing into preform 110.

While the second pressure may be less than atmospheric pressure, the second pressure may also be greater than a minimum pressure at which damage to the porous matrix of preform 110 occurs. For instance, a second pressure below the minimum pressure may cause collapse of the voids (pores) within the CMC preform 110. As such, a pressure setting device (not shown) may be added to the system for the benefit of controlling the second pressure of first region 120 of casting apparatus 100.

Figure 3:
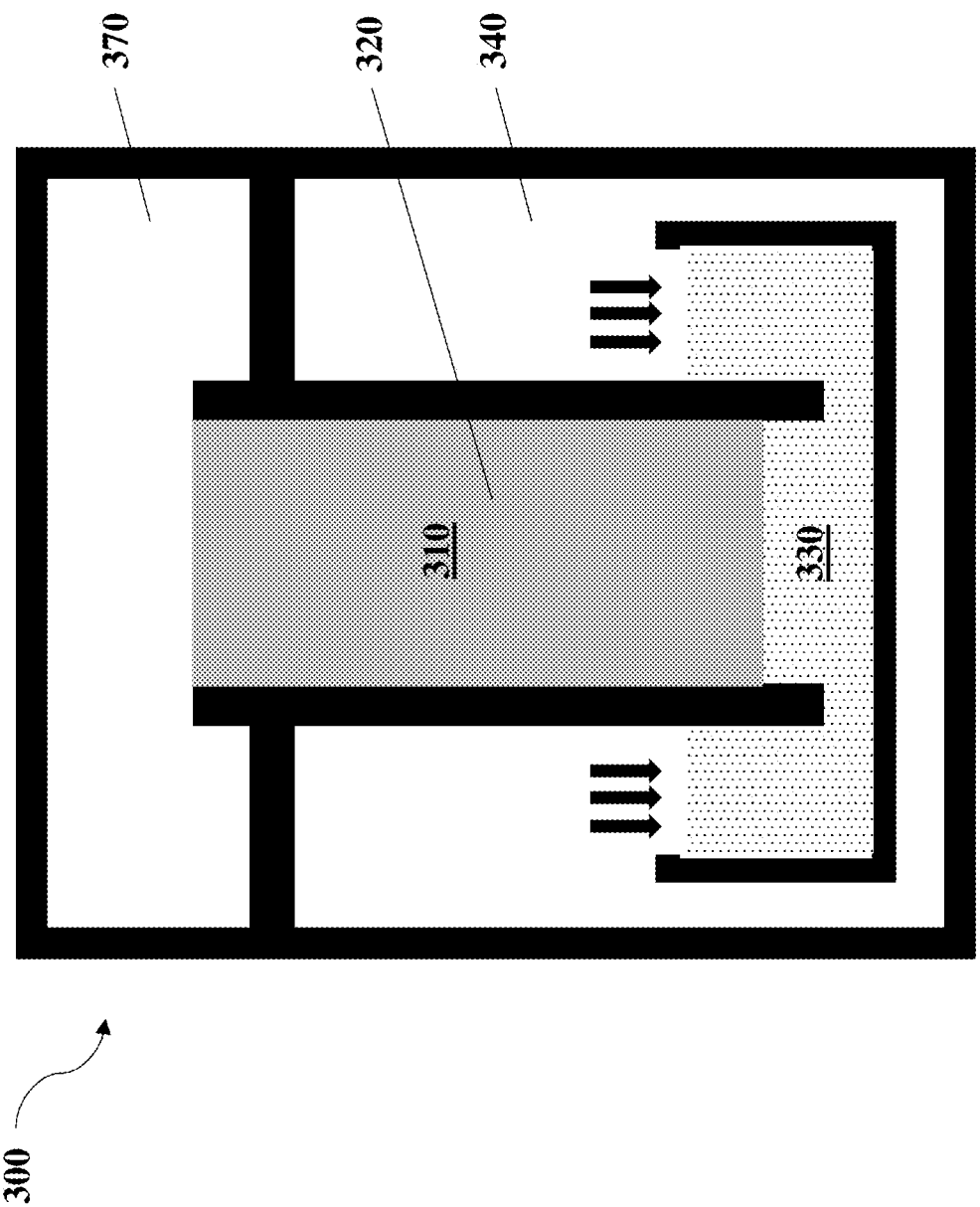
FIG. 3 depicts a schematic of yet another exemplary casting apparatus for forming a densified melt infiltrated CMC article of the disclosure.

FIG. 3 depicts another exemplary embodiment wherein methods of the disclosure may be performed utilizing multiple pressures. In this embodiment, a porous CMC preform 310 is provided within a first region 320 of a casting apparatus 300. Before, after or contemporaneously with providing porous CMC preform 310 in first region 320, a molten densifier 330 can be provided within a pressure head area of a second region 340 of casting apparatus 300. Preform 310 and molten densifier 330 may be the same as described above (110, 130 and/or 210, 230). This embodiment differs from those discussed above in that a third region 370 of casting apparatus 300 is utilized.

Third region 370 has its own pressure, different from that of the first pressure of second region 340. More specifically, the first pressure of second region 340 may be greater than the pressure of third region 370 and the porous CMC preform 310 may be located between second and third regions 340, 370 (e.g., spanning there between). It is the difference between the first pressure of second region 340 and the pressure of third region 370 that allows for infiltration of preform 310 by molten densifier 330. In the above noted instance where the first pressure of second region 340 is greater than the pressure of third region 370, the first pressure exerts force (see arrows) on molten densifier 330 and forces it into porous CMC preform 310.

Figure 4:
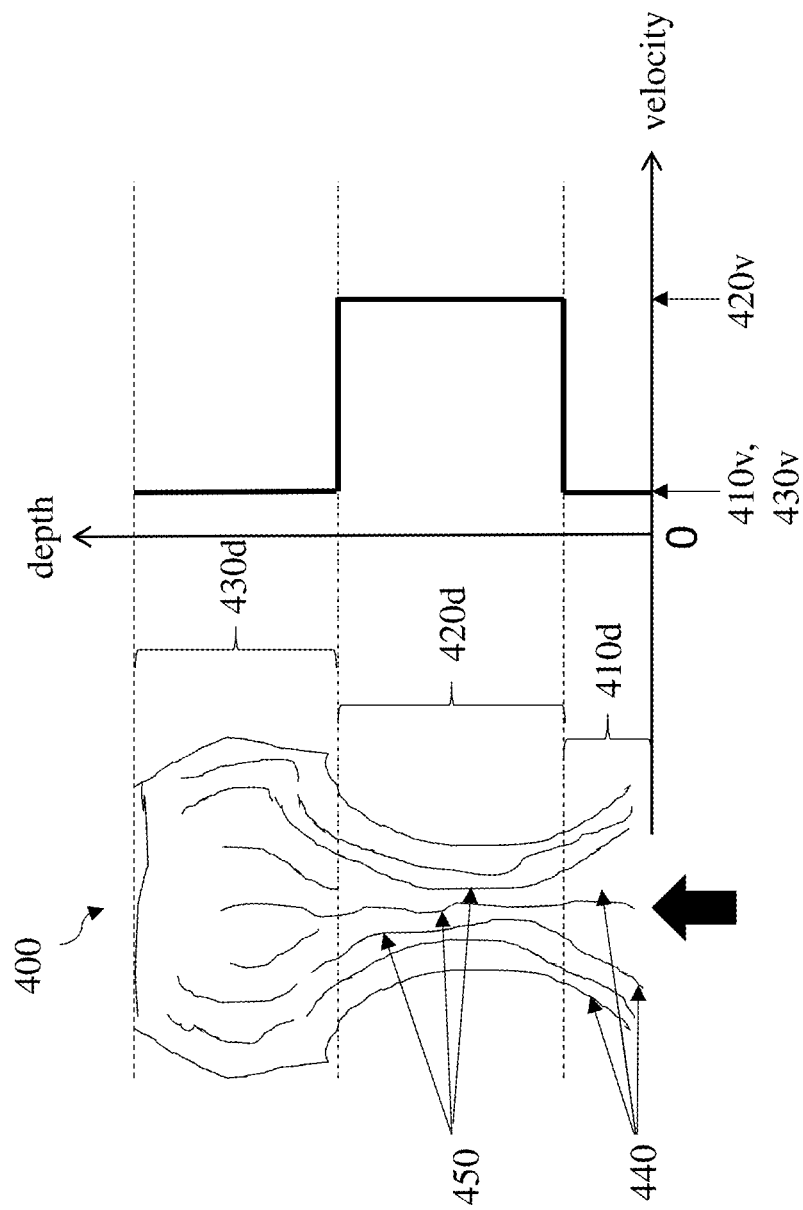
FIG. 4 depicts relative velocities and depths associated with in-plane infiltration for forming a densified melt infiltrated CMC article of the disclosure.

FIG. 4 depicts relative velocities and depths associated with one or more embodiments of the disclosure wherein the methods of the disclosure are performed utilizing multiple pressures applied to the molten densifier in a plurality of stages. More specifically, the methods of the disclosure can include applying a stage-one pressure to the molten densifier for a first period of time and then applying a stage-two pressure to the molten densifier for a second period of time. As depicted in FIG. 4, the stage-one pressure can establish a first infiltration velocity 410v of the molten densifier across a first depth 410d of porous CMC preform 400. Similarly, the stage-two pressure can establish a second infiltration velocity 420v of the molten densifier across a second depth 420d of porous CMC preform 400. The methods of the disclosure may be performed utilizing any number of pressure stages. FIG. 4 depicts three stages, i.e., a third infiltration velocity 430v across a third depth 430d, however the disclosure is not so limited. Additionally in a non-limiting example the infiltration velocities 410v, 420v, 430v may be equal to or less than 1 mm/s, as discussed herein.

As depicted in FIG. 4, preform 400 includes ceramic fibers 440, 450. Ceramic fibers 440 are those located within first depth 410d and ceramic fibers 450 are those located within second depth 420d. Ceramic fibers 440 may be less compacted than ceramic fibers 450. Accordingly, to ensure sufficient infiltration of the molten densifier into the entirety of preform 400, first infiltration velocity 410v may be less than second infiltration velocity 420v. In another embodiment, ceramic fibers 440 and ceramic fibers 450 may be compacted to substantially the same degree. Accordingly, any difference between first and second infiltration velocities 410v, 420v may be lessened. As also depicted in FIG. 4, ceramic fibers 440, 450 may be oriented in substantially the same direction during infiltration. This is sometimes referred to as in-plane infiltration.

Figure 5:
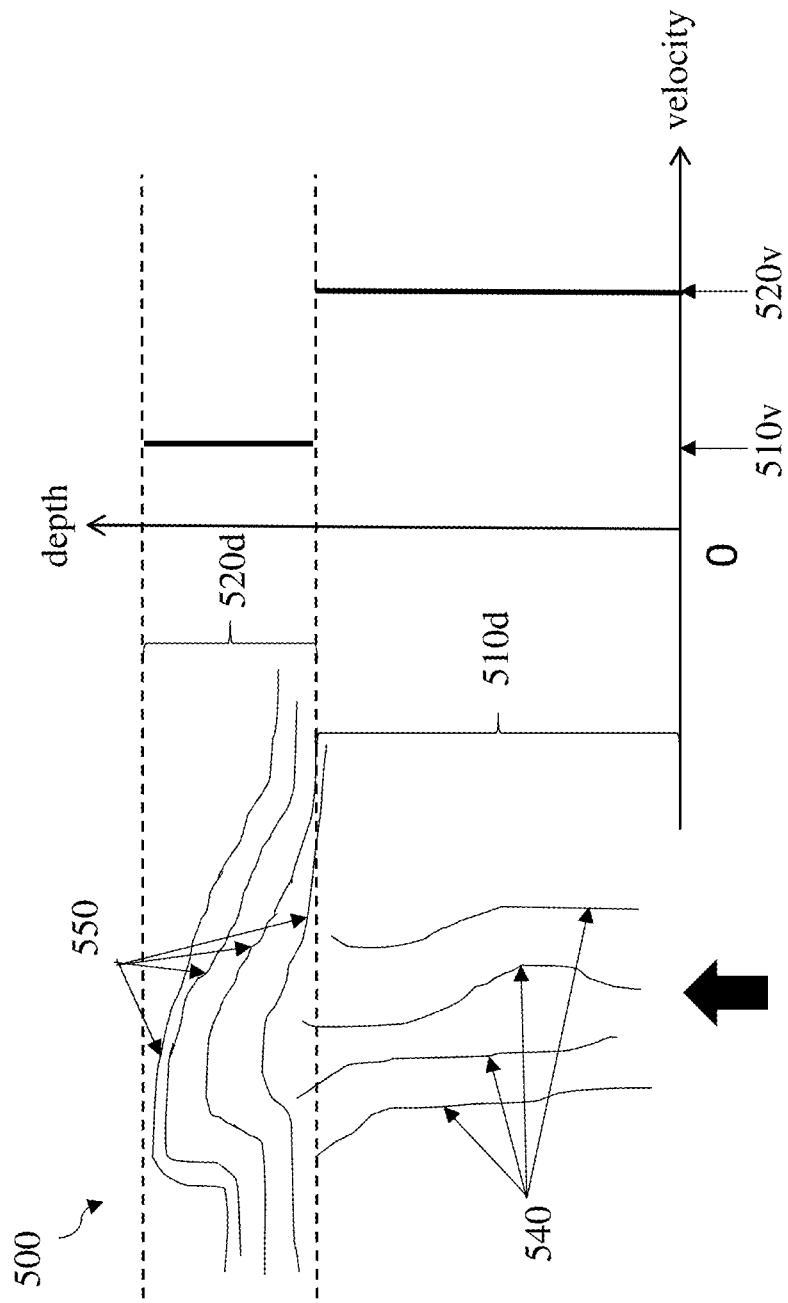
FIG. 5 depicts relative velocities and depths associated with cross-plane infiltration for forming a densified melt infiltrated CMC article of the disclosure.

FIG. 5 depicts a cross-plane infiltration wherein ceramic fibers of a CMC preform are oriented substantially orthogonal to one another. As depicted in FIG. 5, the stage-one pressure can establish a first infiltration velocity 510v of the molten densifier across a first depth 510d of porous CMC preform 500. Similarly, the stage-two pressure can establish a second infiltration velocity 520v of the molten densifier across a second depth 520d of porous CMC preform 500. The methods of the disclosure may be performed utilizing any number of pressure stages. FIG. 5 depicts two stages, however the disclosure is not so limited. Additionally in a non-limiting example the infiltration velocities 510v, 520v may be equal to or less than 1 mm/s, as discussed herein.

Preform 500 includes ceramic fibers 540, 550. Ceramic fibers 540 are those located within a first depth 510d of preform 500 and ceramic fibers 550 are those located within a second depth 520d of preform 500. Ceramic fibers 540 are oriented substantially orthogonal to ceramic fibers 550, fibers 540 being in the direction of infiltration (see arrow) and fibers 550 being substantially orthogonal thereto. Accordingly, to ensure sufficient infiltration of the molten densifier into the entirety of preform 500, first infiltration velocity 510v may be less than second infiltration velocity 520v.

Utilizing any one or more of the above discussed methods of the disclosure, a densified melt infiltrated CMC article can be obtained. The densified CMC article of the disclosure can include a porous ceramic matrix having a densifier (e.g., at least silicon) infiltrated therein, and ceramic fibers embedded in the ceramic matrix. The densified CMC article of the disclosure can have a substantially uniform density. The substantially uniform density of the CMC article of the disclosure can be obtained and/or maintained even when the CMC article has an increased thickness and/or includes portions having a greater thickness than other portions (e.g., non-uniform thickness). As noted at the outset of the disclosure, such densified CMC articles of the disclosure can be used as components of a gas turbine engine due to their low density, thermal resistance, high temperature strength and creep properties, and chemical stability.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). "Substantially" refers to largely, for the most part, entirely specified or any slight deviation which provides the same technical benefits of the disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

We claim:

1. A method for densifying a melt infiltrated ceramic matrix composite (CMC) article, comprising:
   providing a porous CMC preform within a first region of a casting apparatus;
   providing a molten densifier within a pressure head area of a second region of the casting apparatus, the first and second regions being operably connected and the molten densifier including at least one source of silicon; and
   applying a first pressure to the molten densifier within the pressure head, thereby infiltrating voids within the porous CMC preform with the molten densifier and forming a densified melt infiltrated CMC article, wherein the first pressure applied to the molten densifier is atmospheric pressure, and the first and second regions of the casting apparatus are oriented with one another such that a weight of the molten densifier within the pressure head area allows for infiltration of the porous CMC preform with the molten densifier, and wherein the first region of the casting apparatus includes a die set containing the porous CMC preform, the die set having at least two portions that are capable of moving relative to one another and creating a die opening there between,
   further including adjusting an opening width of the die opening during the applying of the first pressure.

2. The method of claim 1, wherein the adjusting of the opening width of the die opening includes adjusting the opening width to a selected opening width, the selected opening width reducing or inhibiting damage to a porous matrix of the porous CMC preform.

3. The method of claim 1, wherein the first pressure applied to the molten densifier is greater than atmospheric pressure, and the first and second regions of the casting apparatus are operably coupled with one another such that the infiltrating of the porous CMC preform with the molten densifier at the first pressure greater than atmospheric pressure is performed without damaging the porous matrix of the porous CMC preform.

4. The method of claim 3, wherein at least one of the first region and the second region of the casting apparatus includes an inlet for passing the molten densifier to the porous CMC preform.

5. The method of claim 1, wherein the casting apparatus includes a third region, the porous CMC preform spanning between the second and third regions.

6. The method of claim 5, wherein the first pressure of the second region is greater than a pressure of the third region, and the difference between the first pressure of the second region and the pressure of the third region allows for infiltration of the porous CMC preform with the molten densifier.

7. The method of claim 1, wherein the first pressure is applied is less than about 3 Bars.

8. A method for densifying a melt infiltrated ceramic matrix composite (CMC) article, comprising:
   providing a porous CMC preform within a first region of a casting apparatus;
   providing a molten densifier within a pressure head area of a second region of the casting apparatus, the first and second regions being operably connected and the molten densifier including at least one source of silicon; and
   applying a first pressure to the molten densifier within the pressure head, thereby infiltrating voids within the porous CMC preform with the molten densifier and forming a densified melt infiltrated CMC article, wherein the first pressure is applied is less than about 3 Bars, wherein the first pressure applied to the molten densifier is atmospheric pressure, and the first and second regions of the casting apparatus are oriented with one another such that a weight of the molten densifier within the pressure head area allows for infiltration of the porous CMC preform with the molten densifier, and wherein the first region of the casting apparatus includes a die set containing the porous CMC preform, the die set having at least two portions that are capable of moving relative to one another and creating a die opening there between, and
   further including adjusting an opening width of the die opening during the applying of the first pressure.

9. The method of claim 8, wherein the adjusting of the opening width of the die opening includes adjusting the opening width to a selected opening width, the selected opening width reducing or inhibiting damage to a porous matrix of the porous CMC preform.

10. The method of claim 8, wherein the first pressure applied to the molten densifier is greater than atmospheric pressure, and the first and second regions of the casting apparatus are operably coupled with one another such that the infiltrating of the porous CMC preform with the molten densifier at the first pressure greater than atmospheric pressure is performed without damaging the porous matrix of the porous CMC preform.

11. The method of claim 10, wherein at least one of the first region and the second region of the casting apparatus includes an inlet for passing the molten densifier to the porous CMC preform.

\* \* \* \* \*